US012754763B2

(12) United States Patent
Yadav et al.

(10) Patent No.: US 12,754,763 B2

(45) Date of Patent: Oct. 6, 2026

(54) METHOD AND SYSTEM FOR IDENTIFYING A TASK SEQUENCE FROM AN INTERACTION STREAM

(71) Applicant: EdgeVerve Systems Limited, Bangalore (IN)

(72) Inventors: Archana Yadav, Pune (IN); Amrutha Bailuri, Bangalore (IN)

(73) Assignee: EDGEVERVE SYSTEMS LIMITED, Bangalore (IN)

( * ) Notice: Subject to any disclaimer, the term of this patent is extended or adjusted under 35 U.S.C. 154(b) by 599 days.

(21) Appl. No.: 18/225,500

(22) Filed: Jul. 24, 2023

(65) Prior Publication Data

US 2024/0303110 A1 Sep. 12, 2024

(30) Foreign Application Priority Data

Mar. 9, 2023 (IN) ............................. 202341015805

(51) Int. Cl.

*G06F 9/48* (2006.01)

*G06F 16/26* (2019.01)

(52) U.S. Cl.

CPC ............ *G06F 9/4881* (2013.01); *G06F 16/26* (2019.01)

(58) Field of Classification Search

None

See application file for complete search history.

(56) References Cited

U.S. PATENT DOCUMENTS

2004/0260593 A1* 12/2004 Abraham-Fuchs .......................... G06Q 10/06316 705/7.42

2012/0330993 A1* 12/2012 Faiman .................. G06F 16/20 707/769

2015/0006531 A1* 1/2015 Deshpande ........... G06F 16/783 707/737

2017/0147538 A1* 5/2017 Gao ...................... G06F 40/129

2018/0129755 A1* 5/2018 Garner .................... G06F 17/18

2020/0206920 A1* 7/2020 Ma ...................... G06F 11/3476

(Continued)

FOREIGN PATENT DOCUMENTS

AU 2014205389 A1 * 6/2015 ........... H04L 63/125

CN 108021431 A * 5/2018 ........... G06F 9/4881

*Primary Examiner* — Uyen T Le

(74) *Attorney, Agent, or Firm* — Troutman Pepper Locke LLP

(57) ABSTRACT

The present disclosure relates to the method and system for identifying a task sequence from interaction stream. Method includes receiving interaction stream related to one or more interactions of user with computing system, one or more events that occurred from one or more interactions. The processed interaction stream is transformed into n-grams. Thereafter, a plurality of potential data candidates is identified for each of n-grams by interpreting corresponding start markers and end markers. Thereafter, method includes transforming each of identified plurality of potential data candidates into corresponding potential data candidate vector, and determining similarity score for each pair of plurality of potential data candidates by comparing each of plurality of potential data candidate vectors of corresponding pair of the plurality of potential data candidates. Finally, plurality of potential data candidates are grouped into one or more groups based on similarity score of corresponding plurality of potential data candidates.

11 Claims, 6 Drawing Sheets

(56) References Cited

U.S. PATENT DOCUMENTS

| | | | | |
|---|---|---|---|---|
| 2022/0121549 | A1* | 4/2022 | Shirwadkar | G06F 11/3438 |
| 2023/0144763 | A1* | 5/2023 | Peng | G06F 21/6254 |
| | | | | 707/692 |

* cited by examiner

| | evt_id | pp_prcname | app_title | app_typ | pp_exepath | args | b_fileversi | b_prodvers | cnt_clsnan | cont_critid | ctrl_name | ctrl_id | bos_scroll |
|---|---|---|---|---|---|---|---|---|---|---|---|---|---|
| 0 | f0144d40 | excel | Procurement | excel | C:\Windc | C:\Windo | 16.0.1493 | 16.0.1493 | Shell_Tr | 50033 | Outlook | -50000 | 0 |
| 1 | 742cfd17 | outlook | Sent Item | win | C:\Progra | C:\Progra | 16.0.1039 | 16.0.1039 | rctrl_ren | 50032 | | 50029 | 0 |
| 2 | 4e52650b | chrome | HP 15s,1 | Chrome | | | 108.0.535 | 108.0.5359.99 | | | Searching html | | 1728 |
| 3 | 5c832d9b | chrome | HP 15s,1 | Chrome | | | 108.0.535 | 108.0.5359.99 | | | scroll #id body | | 1152 |
| 4 | d555a919 | outlook | Sent Item | win | C:\Progra | C:\Progra | 16.0.1039 | 16.0.1039 | rctrl_ren | 50032 | | 50029 | 0 |
| 5 | 1b6eeaa | outlook | Sent Item | win | C:\Progra | C:\Progra | 16.0.1039 | 16.0.1039 | rctrl_ren | 50032 | | 50029 | 44 |
| 6 | 6f54a4a4 | outlook | | win | C:\Program Files | | 16.0.1493 | 16.0.14931.20806 | | | | | 0 |
| 7 | eef4dd20 | explorer | Inbox - | win | C:\Windc | C:\Windo | 10.0.1904 | 10.0.1904 | Shell_Tr | 50033 | Outlook | 50000 | 0 |
| 8 | 41009b9c | excel | | win | C:\Program Files | | 16.0.1493 | 16.0.14931.20806 | | | | | 0 |
| 9 | 662ec820 | excel | Procurement | excel | https://infosystech | | 16.0.1493 | 16.0.14931.20806 | | | Sheet1 | | 0 |
| 10 | 3f29050d | chrome | HP 15s,1 | Chrome | | | 108.0.535 | 108.0.5359.99 | | | Searching twotabse | | 576 |
| 11 | 35207453 | chrome | HP 15s,1 | Chrome | | | 108.0.535 | 108.0.5359.99 | | | Searching twotabse | | 576 |
| 12 | 4c452a15 | chrome | HP 15s,1 | Chrome | | | 108.0.535 | 108.0.5359.99 | | | Searching twotabse | | 1152 |
| 13 | cd532aef | excel | Procurement | excel | C:\Windc | C:\Windo | 16.0.1493 | 16.0.1493 | Shell_Tr | 50033 | Outlook | 50000 | 0 |
| 14 | 223405b8 | outlook | Inbox - | win | C:\Progra | C:\Progra | 16.0.1493 | 16.0.1493 | rctrl_ren | 50032 | File Tab | 50000 | 0 |
| 15 | be5f6dce | outlook | Inbox - | win | C:\Progra | C:\Progra | 16.0.1493 | 16.0.1493 | rctrl_ren | 50032 | Back | 50007 | 0 |
| 16 | 95304564 | explorer | Task Swi | win | C:\Windc | C:\Windo | 10.0.1904 | 10.0.1904 | TaskList | 50008 | Discover | 50007 | 0 |
| 17 | 9c8dd4b5 | outlook | Inbox - | win | C:\Progra | C:\Progra | 16.0.1493 | 16.0.1493 | rctrl_ren | 50032 | Ribbon | 50018 | 0 |
| 18 | 49b8be0c | outlook | Inbox - | win | C:\Progra | C:\Progra | 16.0.1493 | 16.0.1493 | rctrl_ren | 50032 | New Ema | 50000 | 0 |
| 19 | 8d83a60a | outlook | | win | C:\Program Files | | 16.0.1493 | 16.0.14931.20806 | | | | | 0 |
| 20 | d095396c | outlook | Untitled | win | C:\Progra | C:\Progra | 16.0.1493 | 16.0.1493 | rctrl_ren | 50032 | To | 50004 | 0 |
| 21 | 5f99607d | chrome | HP 15s,1 | Chrome | | | 108.0.535 | 108.0.5359.99 | | | Clicked on nav-sear | | 1728 |
| 22 | a8cb2e65 | chrome | HP 15s,1 | Chrome | | | 108.0.535 | 108.0.5359.99 | | | Clicked on nav-sear | | 2304 |
| 23 | 3960ebef | chrome | Amazon.i | Chrome | | | 108.0.535 | 108.0.5359.99 | | | Selected :nth-chil | | 0 |
| 24 | 52600481 | chrome | Amazon.i | Chrome | | | 108.0.535 | 108.0.5359.99 | | | Selected :nth-chil | | 0 |
| 5000 | 5e965a02 | chrome | Chrome | Chrome | | | 108.0.535 | 108.0.5359.99 | | | newtab | newtab | 0 |

FIG. 2B

METHOD AND SYSTEM FOR IDENTIFYING A TASK SEQUENCE FROM AN INTERACTION STREAM

CROSS-REFERENCE TO RELATED APPLICATION

This application claims priority to Indian patent application Ser. No. 202341015805, filed on Mar. 9, 2023, which is hereby incorporated by reference in its entirety.

TECHNICAL FIELD

Present disclosure generally relates to the field of process mining. Particularly but not exclusively, the present disclosure relates to a method and system of identifying a task sequence from an interaction stream.

BACKGROUND

Extracting information or data mining is the process of sorting through large data sets to identify patterns and relationships that can help solve business problems through data analysis. Task discovery is part of process mining that requires a user to indicate the start and stop of a task. This may be challenging in a few scenarios which may directly impact on operator productivity as it is linked to both training on start markers and stop markers. Further, there may be delay in identifying start markers and stop markers of the transactions. Further, keeping confidentiality around the task mapping effort may be a major challenge.

One of the existing technologies discloses a user interaction with multiple applications that may be executed on a computational device which are monitored by intercepting messages corresponding to application-level events and recording data associated with the events, including, e.g., contents of application screens presented when the events occurred. Further, the existing technology discloses that the screen contents may be used, based on comparison with task-specific screen-sequence patterns, to link sub-sequences of the events to tasks, facilitating subsequent task-related analysis. However, maintaining confidentiality around the task mapping is a major challenge. In some other techniques a user has to manually login to a system where the user has to run through large sets of data records which may be extremely tedious and time-consuming. In other words, the user will have to scroll through this entire dataset to first understand the nature of the data, analyze the possible tasks carried out throughout the dataset and then come up with probable start and stop markers which may lead to data security threat in case of sensitive information as multiple users run through the dataset. Such a task is entirely dependent on the capability and analysis strategy of each individual. Since each human being thinks differently, the probable start and stop markers identified using such manual approach may be inconsistent, leading to incorrect results.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the conventional systems are overcome by system and method as claimed and additional advantages are provided through the provision of system and method as claimed in the present disclosure. Additional features and advantages are realized through the techniques of the present disclosure. Other embodiments and aspects of the disclosure are described in detail herein and are considered a part of the claimed disclosure.

In one non-limiting embodiment of the present disclosure discloses a method for identifying a task sequence from an interaction stream. The interaction stream can be defined as a continuous stream of action or events performed by a user via a computing system. In some embodiments, the computing system may be associated with discover sensors. Discover Sensors or a discovery module may be used for capturing data related to the actions or events performed by the user. In some embodiments, the discover sensors or the discovery module may include various plugins for variety of application types. The discovery modules helps in capturing user action information like control information which may be one or more of control name, control action, control id, the application type, application title or URL as applicable, the type of action (mouse click/right click/etc. . . . , keyboard press, special functions, combination keys, etc. . . . ) and more such details depending on various configurations present in the system to augment the above basic data for handling certain specialized use cases. The method includes receiving, by a computing system, an interaction stream related to one or more interactions of a user with the computing system, one or more events that occurred from the one or more interactions. The processed interaction stream is transformed into n-grams. Further, the method includes identifying a plurality of potential data candidates for each of the n-grams by defining corresponding start markers and end markers. In the present disclosure, the phrase “end markers” and “stop markers” may be interchangeably used. Start markers can be defined as a sequence of actions or events that denote the beginning of a transaction and end marker can be defined as a sequence of actions or events that denote the end of a transaction. The examples of the start markers and end markers are explained in detail in the below sections of the present disclosure. The method includes transforming for each of the n-grams each of the identified plurality of potential data candidates into a corresponding potential data candidate vector. The potential data candidate vectors are numerical representation of the plurality of potential data candidates. Further, the method includes determining a similarity score for each pair of the plurality of potential data candidates based on comparison of each of the plurality of the potential data candidate vectors of the corresponding pair of the plurality of potential data candidates. Finally, the method includes grouping the plurality of potential data candidates into one or more groups based on the similarity score of a corresponding plurality of potential data candidates. Each of the one or more groups indicates a unique task sequence of the processed interaction stream.

Another non-limiting embodiment of the disclosure discloses a computing system for identifying a task sequence from an interaction stream. The memory stores the processor-executable instructions, which, on execution, causes the processor to receive an interaction stream related to one or more interactions of a user with the computing system, one or more events that occurred from the one or more interactions. The processed interaction stream is transformed into n-grams. Further, the processor identifies a plurality of potential data candidates for each of the n-grams by defining corresponding start markers and end markers. Thereafter, for each of the n-grams, the processor transforms each of the identified plurality of potential data candidates into a corresponding potential data candidate vector. The potential data candidate vectors are numerical representations of the plurality of potential data candidates. Further, the processor determines a similarity score for each pair of the plurality of potential data candidates based on comparison of each of the plurality of the potential data candidate vectors of the corresponding pair of the plurality of potential data candidates. Finally, the processor groups the plurality of potential data candidates into one or more groups based on the similarity score of a corresponding plurality of potential data candidates. Each of the one or more groups indicates a unique task sequence of the processed interaction stream.

Furthermore, the present disclosure includes a non-transitory computer readable medium including instructions stored thereon that when processed by at least one processor causes a computing system to perform operations comprising receiving an interaction stream related to one or more interactions of one or more users with the computing system, one or more events that occurred from the one or more interactions. The processed interaction stream is transformed into n-grams. Further, the instructions cause the processor to identify a plurality of potential data candidates for each of the n-grams by interpreting corresponding start markers and end markers. The instructions cause the processor to transform for each of the n-grams, each of the identified plurality of potential data candidates into a corresponding potential data candidate vector. The potential data candidate vectors are numerical representation of the plurality of potential data candidates. Further, the instructions cause the processor to determine a similarity score for each pair of the plurality of potential data candidates based on comparison of each of the plurality of the potential data candidate vectors of the corresponding pair of the plurality of potential data candidates. Finally, the instructions cause the processor to group the plurality of potential data candidates into one or more groups based on the similarity score of a corresponding plurality of potential data candidates. Each of the one or more groups indicates a unique task sequence of the processed interaction stream.

It is to be understood that aspects and embodiments of the disclosure described above may be used in any combination with each other. Several aspects and embodiments may be combined together to form a further embodiment of the disclosure.

The foregoing summary is illustrative only and is not intended to be in any way limiting. In addition to illustrative aspects, embodiments, and features described above, further aspects, embodiments, and features will become apparent by reference to drawings and the following detailed description.

BRIEF DESCRIPTION OF THE ACCOMPANYING FIGURES

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference features and components. Some embodiments of the system and/or methods in accordance with embodiments of the present subject matter are now described, by way of example only, and with reference to the accompanying figures, in which:

FIG. 2B shows an exemplary table of the raw data of the task sequence, in accordance with some embodiments of the present disclosure;

Figure 1:
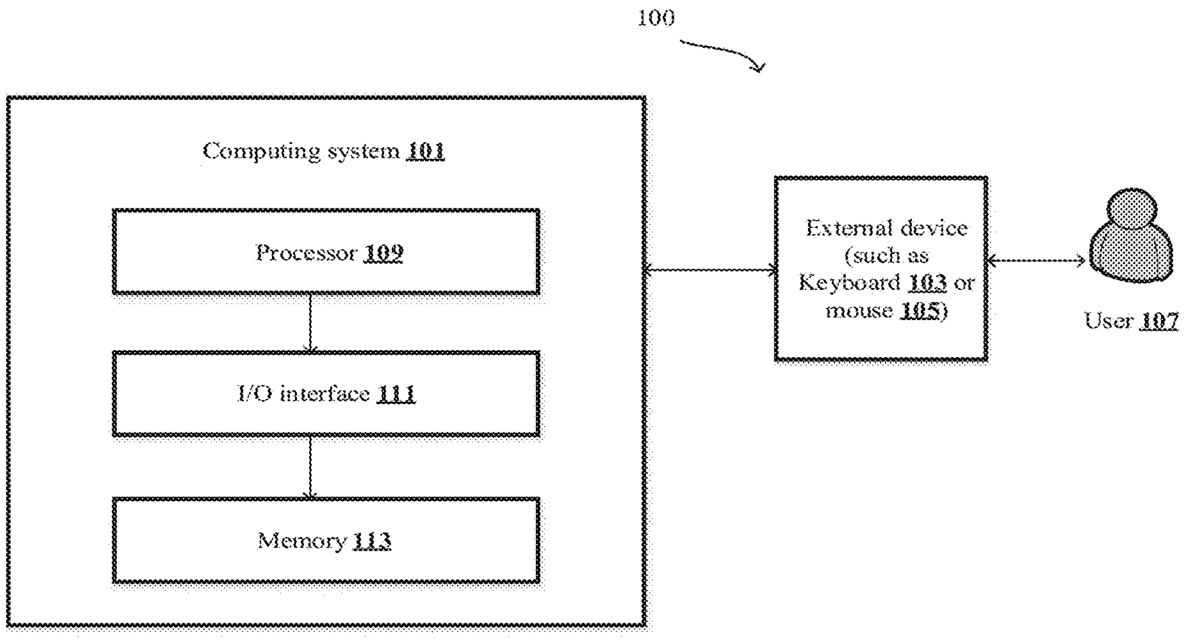
FIG. 1 illustrates an exemplary architecture for identifying a task sequence from an interaction stream, in accordance with some embodiments of the present disclosure.

It should be appreciated by those skilled in art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

The figures depict embodiments of the disclosure for purposes of illustration only. One skilled in the art will readily recognize from the following description that alternative embodiments of the system illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system of identifying a task sequence from an interaction stream. A task sequence can be defined as a designed effort or process, usually implemented by an experience operator (e.g., company, organization), to enable effective user management and resource provisioning, application life cycle management, workflow implementation, user engagement, traffic monitoring, activity tracking, provisioning for application modeling. In other words, task sequence can be defined as a series of steps or interactions which begin with a start marker and ends with an end marker. In the present disclosure, “task sequence” and “transaction” may be used interchangeably. For instance, the task can be a user booking the flight ticket which includes user interaction and the task sequence. Initially the user interested in booking the flight ticket may login to a booking website, enter source details and destination details, enter the date of journey and select the date from a dropdown, check the availability of tickets. The user may scroll through the entire webpage to select a flight for his journey. Further, the user may checkout to payment and enter the details of his card and confirm the flight ticket. The task sequence involves collection of data from a large number of entities and subsequent processing of the collected data. The present disclosure envisages the aspect of identifying a task sequence from an interaction stream performed on a screen of a computing system. As an example, the computing device may be a smartphone, a tablet phone, a desktop computer, a laptop, and the like. The present disclosure describes that the computing system may receive a processed interaction stream related to one or more interactions of one or more users with the computing system, one or more events that occurred from the one or more interactions. The processed interaction stream is transformed into n-grams. The type of user interaction may include, but not limited to, keyboard interaction or mouse interaction. As an example, one or more events may be keyboard/mouse interaction such as typing, filling an application form, booking tickets and the like. In some embodiments, the processed input data is received by the computing system comprising the user interactions with screen elements of the computing system, one or more events occurring from the user interactions. In the present disclosure, the processed interaction stream is obtained by performing one or more data cleansing operations based on one or more domain specific predefined rules.

Further, the present disclosure describes that upon transforming the processed interaction stream into n-grams, the processor identifies a plurality of potential data candidates for each of the n-grams by defining corresponding start markers and end markers. Generally, any candidate is eligible to be a transaction by satisfying the defined criteria as configured in an application installed in the computing system. A transaction during the entire computation performed by the computing system is referred as the potential data candidate. The n-grams may include, but not limited to, unigram, bigram, quad gram, pentagram, hexagram, and octagram. The plurality of potential data candidates may be identified based on the same start markers and end markers. The plurality of potential data candidates is formed by determining a weighted score for each of the plurality of data candidates based on frequency of a type of interaction in each of the n-grams and length of each of the plurality of data candidates. Consider an exemplary scenario in which a data candidate A and a data candidate B, where the length of data candidate A is 6 and length of the data candidate B is 7. In some embodiments, the length of the data candidate may be defined as the number of steps or actions or the interactions in a transaction or potential data candidate as applicable throughout the algorithm. Consider, both the data candidates A and B have similar interactions such as refresh, entering first name, submit and the like. From the above exemplary scenario, consider the interactions like refresh, entering first name, and submit have occurred multiple times. Therefore, in such instances, weighted score may be calculated based on the frequency of interactions (in other words, number of occurrences of the interactions) and the length of each of the plurality of data candidates. Further, the weighted score of each of the plurality of data candidates may be normalized based on a predefined function to obtain a prioritization score. Each of the plurality of data candidates are prioritized based on the prioritization score. The predefined function may be an activation function such as sigmoid function. Thereafter, one or more data candidates may be eliminated based on the position of a keyword and predefined acceptable range of length when there are overlapping plurality of data candidates with same start markers and end markers.

In the present disclosure discloses that each of the identified plurality of potential data candidates may be transformed into a corresponding potential data candidate vector. Upon comparison of each of the plurality of the potential data candidate vectors of the corresponding pair of the plurality of potential data candidates, a similarity score for each pair of the plurality of potential data candidates may be determined. Thereafter, the plurality of potential data candidates may be grouped into one or more groups based on the similarity score of a corresponding plurality of potential data candidates. As a result, unique task sequence of the processed interaction stream may be identified.

The present disclosure relates to identifying a task sequence from an interaction stream. The present disclosure provides insights into the effort savings which helps to understand the optimal way of performing a particular task which also saves time as the manual effort is drastically reduced. The present disclosure enables monitoring the user activity and analyzing the time spent on various applications during working hours that may be enhancing productivity of an individual. Based on the one or more groups of potential data candidates, the present disclosure provides insights into the value savings if a certain task is automated. The present disclosure helps to remove redundant tasks which in turn leads to time and cost saving. In the present disclosure, basic or minimal knowledge of the process is sufficient to review the output. Further, the present disclosure is independent of historical data.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture for extracting information based on user interactions performed on a screen of a computing system 101, in accordance with an embodiment of the present disclosure.

The architecture 100 includes a computing system 101, external devices such as keyboard 103, mouse 105 and the like and a user 107. In some embodiments, the computing system may include application that is configured to perform the functionalities disclosed in the present disclosure. In some embodiments, user 107 may use external devices such as a keyboard 103 or a mouse 105 to perform interaction. The present disclosure envisages the aspect of identifying a task sequence from an interaction stream. The present disclosure is explained based on the type of user interactions that may be used for performing a particular task as an example, flight ticket booking, submitting a form, and the like on a computing system 101. For instance, the task can be a user booking the flight ticket which includes user interaction and the task sequence. Initially the user interested in booking the flight ticket may login to a booking website, enter source details and destination details, enter the date of journey and select the date from a dropdown, check the availability of tickets. The user may scroll through the entire webpage to select a flight for his journey. Further, the user may check out to payment and enter the details of his card and confirm the flight ticket.

The external devices may be associated with the computing system 101 via a wired or a wireless communication network. In some embodiments, when user 107 performs one or more interaction via the external devices, the computing system 101 may record each of the user interactions using one or more sensors (not shown in the FIG. 1) associated with the computing system 101. In some embodiments, one or more sensors may include, but not limited to, image capturing devices such as cameras to capture images and videos of the user 107 interacting with the computing system 101.

The computing system 101 may include a processor 109, an I/O interface 111 and a memory 113. The I/O interface 111 may receive an interaction stream related to one or more interactions of a user 107 with the computing system 101, one or more events that occurred from the one or more interactions. The interaction stream can be a processed interaction stream. The processed interaction stream is obtained by performing one or more data cleansing operations based on one or more domain specific predefined rules. As a result, data cleansing helps to maintain data sanity across one or more users.

A task sequence involves collection of data from a large number of entities and can include subsequent processing of the collected data. In other words, task discovery may be defined as identifying the start and end of a transaction and marking out all such transactions and bringing them into logical groups from a large pool of information captured related to the user 107 activity. The present disclosure envisages the aspect of identifying a task sequence from an interaction stream performed on a screen of computing system 101. For instance, a task sequence can be defined as a designed effort or process, usually implemented by a user 107 to enable effective user management and resource provisioning, application life cycle management, workflow implementation, user engagement for application modeling. The present disclosure describes that the computing system 101 may receive an interaction stream related to one or more interactions of a user 107 with the computing system 101, one or more events that occurred from the one or more interactions. The interaction stream can be a processed interaction stream. The processed interaction stream is transformed into n-grams. The type of user interaction may include, but not limited to, a keyboard 103 or a mouse interaction 105. As an example, one or more events may be keyboard/mouse interaction such as typing, filling an application form, booking tickets and the like. In some embodiments, the processed input data received by the computing system 101 includes one or more events occurring from the user interactions. In the present disclosure, the processed interaction stream is obtained by performing one or more data cleansing operations based on one or more domain specific predefined rules. In some embodiments, the one or more events occurring from the user interactions may be captured using one or more sensors. For example, computing systems 101 make use of camera sensors to capture images or video of the user interacting with the system. In some embodiments, digital color cameras may be used as sensing devices for inferring human's hands position, poses and gestures, to be translated into suitable commands for the control of virtually every kind of digital system, which may include, but not limited to, touch screen and virtual keyboard.

In some embodiments, upon receiving the processed interaction stream which may comprise one or more interactions of the user 107, the processor 109 transforms the processed interaction into n-grams. Based on the transformed n-grams, the processor 109 identifies a plurality of potential data candidates for each of the n-grams by defining corresponding start markers and end markers. As an example, n-grams may include, but not limited to, unigram, bigram and quad gram. Particularly, the plurality of potential data candidates is identified based on similar start markers and end markers. For instance, data candidate A and a data candidate B where the length of data candidate A is 6 and length of data candidate B is 7. Consider, both the data candidates A and B have similar interactions such as refresh, entering first name, submit, and the like. From the above exemplary scenario, consider the interactions like refresh, entering first name, submit have occurred multiple times. Therefore, in such instances the weighted score may be calculated for each of the plurality of data candidates based on the frequency of a type of interaction in each of the n-grams and length of each of the plurality of data candidates. The number of occurrences of a type of interaction in each of the n-grams may be defined as the frequency in each of the n-grams. As an example, the processor 109 checks the frequency of a type of interaction and length in data candidate A and data candidate B based on which a weighted score is determined. Further, the processor 109 normalizes the weighted score of each of the plurality of data candidates based on a predefined function to obtain prioritization score. Each of the plurality of data candidates is prioritized based on the prioritization score. Thereafter, the processor 109 eliminates one or more data candidates based on determined weighted score, presence, and position of one or more keywords in the plurality of data candidates and based on the predefined acceptable range of length when overlapping plurality of data candidates with same start markers and end markers are present. When the plurality of potential data candidates is formed based on the plurality of data candidates, the processor 109 transforms the plurality of potential data candidates into corresponding potential data candidate vector which may be of numerical representation. The potential data candidate vector may be formed based on at least one of a frequency of a type of interaction and presence or absence of the interaction by comparing each interaction of each of the plurality of the data candidate with each corresponding interaction of each of rest of the plurality of data candidates.

In some embodiments, the processor 109 determines a similarity score for each pair of the plurality of potential data candidates based on comparison of each of the plurality of the potential data candidate vectors of the corresponding pair of the plurality of potential data candidates. For instance, the potential data candidate vector A and potential data candidate vector B are compared to check for the similarities based on which the similarity score is determined for each pair of the plurality of potential data candidates. The processor 109 compares each interaction of each of the plurality of the potential data candidate vectors with each corresponding interaction of each of rest of the plurality of potential data candidate vectors by assigning a predefined score. The processor 109 assigns predefined first score which may be a maximum score, if there is exact match of frequency of a type of interaction between two potential data candidate vectors. Further, the processor 109 may assign a predefined second score which may be a fractional score if there is a mismatch of frequency of a type of interaction between two potential data candidate vectors. The processor 109 may assign a predefined third score which may be a penalty score if there is an absence of a common type of interaction between two potential data candidate vectors. Further, the processor 109 determines a cumulative score based on the predefined first score, the predefined second score and the predefined third score assigned to each interaction of the corresponding plurality of potential data candidates. Based on the similarity score, the processor 109 groups the plurality of potential data candidates into one or more groups based on the similarity score of a corresponding plurality of potential data candidates. The one or more groups indicate a unique task sequence of the processed interaction stream.

FIG. 2 shows a detailed block diagram of the computing system 101 for identifying a task sequence from an interaction stream, in accordance with some embodiments of the present disclosure.

Figure 2A:
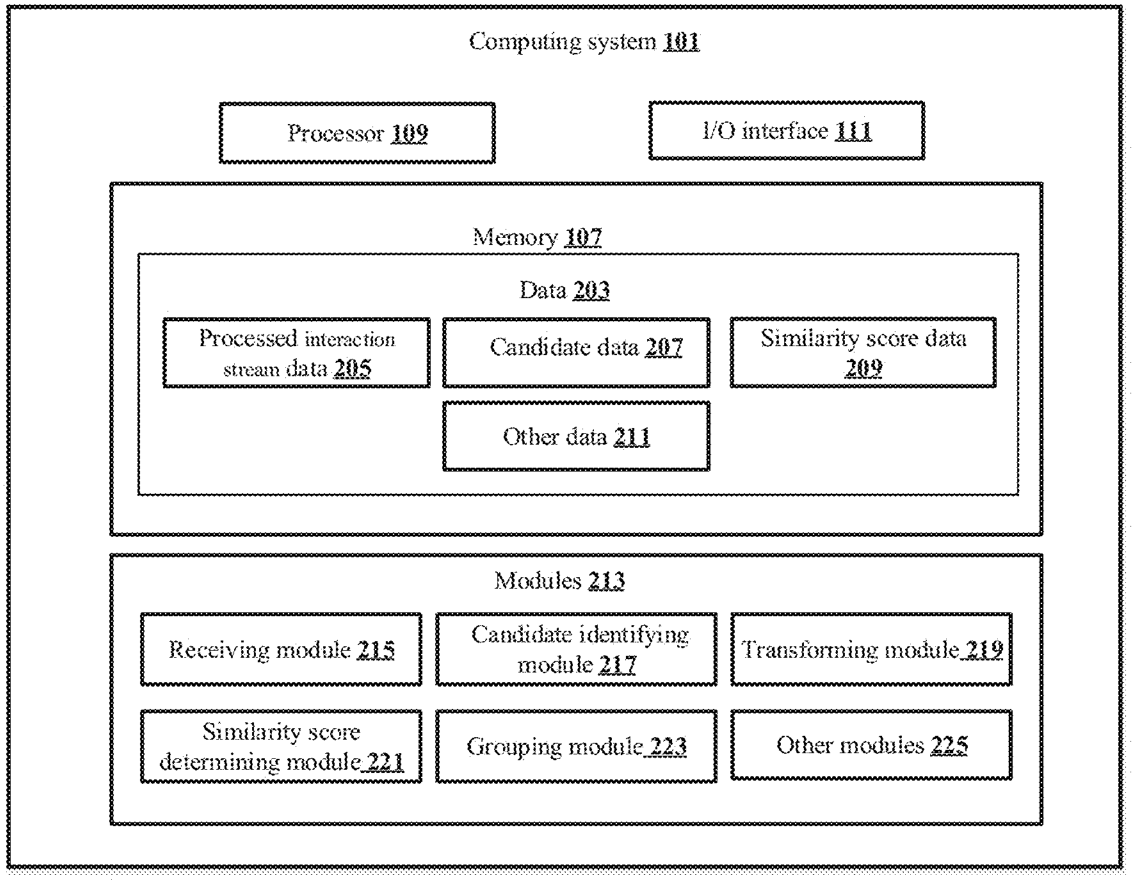
FIG. 2A shows a detailed block diagram of the computing system for identifying a task sequence from an interaction stream, in accordance with some embodiments of the present disclosure.

In some implementations, computing system 101 may include data 203 and modules 213. As an example, data 203 is stored in memory 113 as shown in FIG. 2A. In one embodiment, data 203 may include processed interaction stream data 205, candidate data 207, similarity score data 209 and other data 211. In the illustrated FIG. 2, modules 213 are described herein in detail.

In some embodiments, the data 203 may be stored in memory 113 in the form of various data structures. Additionally, data 203 can be organized using data models, such as relational or hierarchical data models. The other data 211 may store data, including temporary data and temporary files, generated by the modules 213 for performing the various functions of the computing system 101.

In some embodiments, the interaction stream can be a processed interaction stream. The processed interaction stream data 205 corresponds to the data/value of one or more interactions of a user 107 with the computing system 101, one or more events that occurred from one or more interactions. The processed interaction stream is obtained by performing one or more data cleansing operations based on one or more domain specific predefined rules which may help to maintain data sanity across the users 107. As an example, the user 107 may perform one or more interaction for instance start->entering user credentials to login->right click operation->refresh->filling form 1->filling form 2->submitting. Based on the interaction stream, the processed interaction stream data 205 is obtained by performing one or more data cleansing operations based on one or more domain specific predefined rules. Further the processed interaction stream is transformed into n-grams.

In some embodiments, the candidate data 207 corresponds to the data/value of the plurality of data candidates and the plurality of potential data candidates. The plurality of potential data candidates is identified based on the plurality of data candidates. Initially, the plurality of data candidates for each of the n-grams are identified based on corresponding start markers and end markers. Further, a weighted score is determined for each of the plurality of data candidates based on frequency of a type of interaction in each of the n-grams and length of each of the plurality of data candidates. As an example, the computing system 101 checks the number of occurrences of interaction (for instance: refresh may be type of interaction) is present in a particular data candidate and also checks for the length of the data candidates based on which the weighted score is determined. Upon determining the weighted score, the weighted score determined for each plurality of data candidates are normalized using a predefined function to obtain a prioritization score. Each of the plurality of data candidates are prioritized based on the prioritization score. Further, elimination of one or more data candidates from the plurality of data candidates is performed based on prioritization score, presence and position of one or more keywords and based on predefined acceptable range of length when the overlapping plurality of data candidates with same start markers and end markers are present.

For instance, consider data candidate 1 and data candidate 2 have similar five interactions as shown below.

| Data candidate 1 |
|---|
| Step 1: Login to a browser |
| Step 2: Search item |
| Step 3: View item |
| Step 4: Add to cart |
| Step 5: Logout |

| Data candidate 2 |
|---|
| Step 1: Login to a browser |
| Step 2: Search item |
| Step 3: View item |
| Step 4: Add to cart |
| Step 5: Logout |
| Step 6: Go to another browser |
| Step 7: Find another item |
| Step 8: Login on Amazon |
| Step 9: Add to cart |
| Step 10: Buy a product |
| Step 11: logout |

From the above table, data candidate 1 and data candidate 2 have similar steps from 1 to 5. As there are similar steps, one of the candidates will be eliminated and the frequency will be reduced by 1 for the purpose of prioritization score calculation. Further, all the possible comparisons across all data candidate 1 and data candidate 2 are performed. In some embodiments, data candidates with same start and end markers may fall in the acceptable range of length. As an example, consider acceptable range to be 80-120%. From the above example, length of interaction of data candidate 1=5;

length of interaction of data candidate 2=11;

Therefore, the ratio of data candidate 1=5/11=45% and the ratio of data candidate 2=11/5=220%.

From the above example, as both the data candidates 1 and 2 do not fall in the acceptable range of 80-120%, thus one of the candidates will be eliminated and the frequency will be reduced by 1 for the purpose of prioritization score calculation. Further, upon identifying the plurality of potential data candidates based on one or more data candidates, the plurality of potential data candidates is further transformed into a corresponding potential data candidate vector based on which a similarity score may be determined.

In some embodiments, the similarity score data 209 corresponds to the data/value that may be determined for each pair of the plurality of potential data candidates based on comparison of each of the plurality of the potential data candidate vectors of the corresponding pair of the plurality of potential data candidates. For example, a potential data candidate vector A is compared with the potential data candidate vector B in which each interaction of the two candidate vectors is compared based on which a cumulative score may be assigned. The cumulative score may be determined based on the predefined first score, the predefined second score and the predefined third score assigned to each interaction of the corresponding plurality of potential data candidates. Upon determining a cumulative score, the similarity score is determined based on the corresponding cumulative score and a predefined weightage of each of the n-grams.

In some embodiments, the data 203 stored in memory 113 may be processed by the modules 213 of the computing system 101. The modules 213 may be stored within memory 113. In an example, the modules 213 communicatively coupled to the processor 109 of the computing system 101, may also be present outside the memory 113 as shown in FIG. 2A and implemented as hardware. As used herein, the term modules refer to an application specific integrated circuit (ASIC), an electronic circuit, a processor 109 (shared, dedicated, or group) and memory 113 that execute one or more software or firmware programs, a combinational logic circuit, and/or other suitable components that provide the described functionality.

In some embodiments, the modules 213 may include, for example, receiving module 215, candidate identifying module 217, transforming module 219, the similarity score module 221, grouping module 223 and other modules 225. The other modules 225 may be used to perform various miscellaneous functionalities of the computing system 101. It will be appreciated if such aforementioned modules 213 may be represented as a single module or a combination of different modules.

In some embodiments, the receiving module 215 may receive processed interaction stream that may be obtained from the data captured using one or more sensors associated with the computing system 101. The one or more sensors provides information related to one or more events that occurred from the one or more interactions. The data received from one or more sensors defines user interaction that may include, but not limited to, keyboard interaction 103 or a mouse 105 interaction. As an example, the one or more keyboard 103 and mouse 105 events occurring from the user interactions may be at least one of typing, performing actions using keys of the external device, filling a form, booking tickets, and scrolling events during the user interaction such as billing and transaction process. Upon receiving the data from one or more sensors, the receiving module 215 may obtain processed interaction stream which is received by performing one or more data cleansing operations based on one or more domain specific predefined rules. As a result, data sanity can be maintained across the users 107.

In some embodiments, the candidate identifying module 217 may identify data candidates and based on the one or more data candidates, the candidate identifying module 217 identifies plurality of potential data candidates. The candidate identifying module 217 initially identifies plurality of data candidates for each of the n-grams by defining corresponding start markers and end markers. The n-grams may include, but not limited to, unigram, bigram and quad gram. Further, the candidate identifying module 217 may determine the weighted score for each of the plurality of data candidates based on frequency of a type of interaction in each of the n-grams and length of each of the plurality of data candidates. As an example, the candidate identifying module 217 checks the number of occurrences of interaction (for instance: entering first name may be type of interaction) present in a both data candidate A and B and candidate identifying module 217 also checks for the length of the data candidates based on which the weighted score is determined. Based on the determined weighted score for each plurality of data candidates, the candidate identifying module 217 normalizes the weighted score based on a predefined function like sigmoid activation function to obtain a prioritization score. Upon obtaining prioritization score, the candidate identifying module 217 eliminates one or more data candidates from the plurality of data candidates. The elimination is based on the prioritization score of each of the plurality of data candidates and based on at least presence and position of one or more keywords in the plurality of data candidates and based on predefined acceptable range of length when the overlapping plurality of data candidates with same start markers and end markers are present. The plurality of data candidates remaining post elimination is identified as the plurality of potential data candidates.

In some embodiments, the transforming module 217 may transform each of the identified plurality of potential data candidates into a corresponding potential data candidate vector. The potential data candidate vectors are numerical representation of the plurality of potential data candidates. The transforming module 217 may transform each of the identified plurality of potential data candidates into a corresponding potential data candidate vector based on at least one of a frequency of a type of interaction and presence or absence of the interaction, by comparing each interaction of each of the plurality of the data candidate with each corresponding interaction of each of rest of the plurality of data candidates. In some embodiments, the frequency of a type of interaction may be considered for transforming each of the identified plurality of potential data candidates into corresponding potential data candidate vectors only when the presence of the interaction is detected.

In some embodiments, upon transforming plurality of potential data candidates into corresponding plurality of potential data candidate vectors, the similarity score determining module 221 may determine a similarity score for each pair of the plurality of potential data candidates based on comparison of each of the plurality of the potential data candidate vectors of the corresponding pair of the plurality of potential data candidates. In other words, the similarity score determining module 221 compares each interaction of each of the plurality of the potential data candidate vectors with each corresponding interaction of each of rest of the plurality of potential data candidate vectors. The similarity score determining module 221 assigns a predefined first score which may be a maximum score to each interaction of the plurality of potential data candidates, when a comparison results in an exact match of frequency of a type of interaction. Further, the similarity score determining module 221 assigns a predefined second score which can also be referred as a fractional score to each interaction of the plurality of potential data candidates when the comparison results in mismatch of frequency of the type of interaction. Thereafter, the similarity score determining module 221 assigns a predefined third score which can also be referred as penalty score to each interaction of the plurality of potential data candidates when the comparison results in absence of a common type of interaction. Further, the similarity score determining module 221 determines a cumulative score based on the predefined first score, the predefined second score and the predefined third score assigned to each interaction of the corresponding plurality of potential data candidates. Based on the cumulative score, the similarity score determining module 221 determines the similarity score based on the corresponding cumulative score and a predefined weightage of each of the n-grams. The cumulative score may be the indication of similarities between the potential candidates.

For instance, consider 2 potential data candidate vector A and B that may be a unigram with the interaction frequency as given below:

Candidate1: [0, 2, 4, 0]

Candidate2: [3, 5, 4, 0]

Configurable Fraction=0.2

In some embodiments, the configurable fraction 0.2 indicated can be varied as per requirement and should not be construed as a limitation of the present disclosure. Each potential data candidate vector in the respective n-gram is compared with every other candidate to calculate the similarity based on a predefined rule. The predefined rules may be as follows:

1. if a==b and a&b!=0,

Increase the numerator and denominator by 1 unit.

2. If a==b and a&b==0, i.e., if the n-gram is not present in both the candidates, increase it by a small fraction as both the candidates have similarity in not having the particular n-gram Increase the numerator and denominator by a fraction.

3. If a!=b and a>=1 and b>=1 den=max (a, b)

num=|a−b| relative difference=1−(num/den) relative difference is added both to numerator and denominator.

4. If a!=b and (either a==0 or b==0)

Denominator is increased by 1 unit.

Based on the above-mentioned predefined rules, the similarity score may be calculated for potential data candidate vector 1: [0, 2, 4, 0] and potential data candidate vector 1: [3, 5, 4, 0]. Specifically, each n-gram frequency inside the potential data candidate vector 1 is compared with another potential data candidate vector 2.

Step 1: when a=0, b=3,

Rule 4 is applied which denotes that denominator=1.

Step 2: when a=2, b=5

Rule 3 is applied which denotes that num=max (2,5)=5 den=|2−5|=3 frequency score=1−(num/den)=1−(3/5)=0.4 numerator=0.4 denominator=1.4 (1+0.4)

Step 3: when a=4, b=4

Rule 1 is applied which denotes that denominator=1.4+1=2.4 numerator=0.4+1=1.4.

Step 4: when a=0, b=0

Rule 2: denominator=2.4+0.2=2.6 numerator=1.4+0.2=1.6.

Based on the above example, the similarity score may be calculated: numerator/denominator=1.6/2.6=0.62.

Similarly, the similarity score between the above 2 potential data candidate vectors 1 and 2 is calculated for bigrams and quadgrams.

The final score for the above 2 candidates is calculated giving the following configurable weightages:

(Unigram, bigram, quad gram with the weightages—20%, 30%, 50% in the order of their importance. In some embodiments, the configurable fraction 0.2 indicated can be varied as per requirement and should not be construed as a limitation of the present disclosure). Final similarity score (between 2 candidates)=0.2*unigramscore+0.3*bigramscore+0.5*quadgramscore Final score between candidate 1 and 2=0.2*0.62+0.3*($x$)+0.5*($y$)=0.89(assume)

The above will be the score between candidate 1 and 2 in the match matrix:

| | 1 | 2 |
|---|---|---|
| 1 | | **0.89** |
| 2 | | |

In some embodiments, the grouping module 223 may group the plurality of potential data candidates into one or more groups based on the similarity score of a corresponding plurality of potential data candidates. The one or more groups indicate a unique task sequence of the processed interaction stream. As an example, A, B . . . F may be the potential data candidates. Upon comparing one of the potential data candidates with the rest of the potential data candidates and if the predefined cumulative score says 80% is achieved by comparing the potential candidate, then the grouping module 223 may group the potential data candidates into a group which has the 80% similarity score. For instance, potential data candidate A is compared with the rest of the potential data candidates B, C, D, E and F. If the predefined cumulative score of 80% is set and the comparison of potential data candidate A is made with the rest of the potential data candidates, a cumulative score may be obtained as shown in the table below. For instance, if potential data candidate A is compared with the rest of potential data candidates B, C, D, E and F to check if they satisfy the criteria of 80%. The potential data candidate C is eliminated as it does not satisfy the criteria of 80%. Further, the cycle continues by comparing potential data candidate B with D, E and F to check if the said criteria is satisfied. As potential data candidate F does not satisfy the criteria of 80%, potential data candidate F may be eliminated. Thereafter, potential data candidate D is compared with E to check if the criteria is met.

| | A | B | C | D | E | F |
|---|---|---|---|---|---|---|
| A | | **0.89** | 0.45 | **0.82** | **0.92** | **0.97** |
| B | | | 0.6 | **0.92** | **0.84** | 0.77 |
| C | | | | 0.74 | 0.89 | 0.93 |
| D | | | | | **0.82** | 0.96 |
| E | | | | | | 0.45 |
| F | | | | | | |

From the above table, the grouping module 223 groups potential data candidates A, B, D and potential data candidate E as a group which may be indicating a particular task.

The entire process may be repeated with the remaining set of potential data candidates until all possible groups are formed.

As an example, the receiving module 215 may receive a processed interaction stream related to one or more interactions of a user 107 with the computing system 101, one or more events that occurred from the one or more interactions. The processed interaction stream is obtained from one or more sensors associated with the computing system 101. Further the processed interaction stream is transformed into n-grams. The n-grams may be, but not limited to, unigram, bigram, quad gram, and the like. Further, candidate identifying module 217 may identify a plurality of potential data candidates for each of the n-grams by defining corresponding start markers and end markers for each of the n-grams. The candidate identifying module 217 may identify a plurality of potential data candidates based on plurality of data candidates. For instance, consider A . . . F may be the potential data candidates that may be identified by the candidate identifying module 217. Further, the transforming module 219 may transform the identified potential data candidates into corresponding potential data candidate vectors. As an example, consider potential data candidate vector A with the interaction set [0, 2, 4, 0] and potential data candidate vector B with the interaction set [3,5,4,0]. Each of the interactions in potential data candidate vector A and B are compared and a similarity score is obtained for the unigram vector. Similarly, the potential data candidate vectors of bigram and quad gram are also compared, and corresponding similarity score may be obtained from the similarity determining module 221. Upon comparing one of the potential data candidates with the rest of the potential data candidates, if the predefined cumulative score says 80% is achieved, the grouping module 223 may group the potential data candidates into a group which has the 80% similarity score. The cumulative score of 80% indicated can be varied as per requirement and should not be construed as a limitation of the present disclosure. Further, the grouping module 223 performs an inter-group and intra-group comparison of each of the one or more groups to determine presence of at least one overlapping interaction in the plurality of potential data candidates. Based on comparison, the grouping module 223 may eliminate one or more of the plurality of potential data candidates from the one or more groups when the presence of at least one of the overlapping interactions is determined. The elimination is performed based on at least one of, length of the plurality of data candidates that are determined to have overlapping interactions and frequency of a type of interactions in the plurality of data candidates that are determined to have overlapping interactions.

For instance, the one or more users may perform one or more interactions in which there may be duplication of one or more interactions. For example, the user may refresh a website multiple times in which each refresh operation may be considered as an interaction. Similarly, the user may search for multiple products but tend to search for one product and may process to buy the product. For ease of understanding, consider there are three users performing various interactions such as buying the product in a website, adding the identified product which the user desires to buy in a excel and the one or more users may attach the excel and share an email to client or one or more users in which there may be many interaction streams say for example the raw input stream may be of 1-5000 interactions as shown in table of FIG. 2B. To monitor the user activity and analyze the time spent on various applications during working hours, processed input data may be used. The processed interaction stream may comprise the filtered interaction in which all the duplication interactions may be filtered out, for example processed interaction stream may be of 1-500 interactions.

Further, the receiving module may receive the processed interaction stream related to one or more interactions of one or more users with the computing system, one or more events that occurred from the one or more interactions. The processed interaction stream is transformed into n-grams. The n-grams may be, but not limited to, unigram, bigram, quad gram, and the like. Based on the processed interaction stream, the plurality of potential data candidates is identified by the candidate identifying module 217 for each of the n-grams by interpreting corresponding start markers and end markers. Start markers can be defined as a sequence of actions or events that denote the beginning of a transaction and end marker can be defined as a sequence of actions or events that denote the end of a transaction as shown in the below table 1.

TABLE 1

| txn | startMarker | endMarker | txnId | Start_End_QuadFreq | Length | AvgLength |
|---|---|---|---|---|---|---|
| 1 | 63 | 107 | Txn1 | 12 | 44 | 44 |
| 1 | 149 | 187 | Txn1 | 12 | 38 | 44 |
| 1 | 346 | 389 | Txn1 | 12 | 43 | 44 |
| 1 | 425 | 462 | Txn1 | 12 | 37 | 44 |
| 2 | 153 | 193 | Txn2 | 12 | 40 | 44 |
| 2 | 205 | 246 | Txn2 | 12 | 41 | 44 |
| 2 | 258 | 301 | Txn2 | 12 | 43 | 44 |
| 2 | 312 | 354 | Txn2 | 12 | 42 | 44 |
| 2 | 361 | 402 | Txn2 | 12 | 41 | 44 |
| 3 | 180 | 236 | Txn3 | 12 | 56 | 44 |
| 3 | 269 | 321 | Txn3 | 12 | 52 | 44 |
| 3 | 335 | 390 | Txn3 | 12 | 55 | 44 |

For instance, for transaction 1, the start marker may be at step 63 of the interaction and the end marker may be at 107. Based on the start marker and the end marker, the length of the transaction may be represented as 44 as shown in the above table. The length disclosed above defines plurality of potential data candidates between the start marker 63 and end marker 107.

Further, each of the identified plurality of potential data candidates are transformed into a corresponding potential data candidate vector. A transaction during the entire computation of algorithm is referred as the potential data candidate. In other words, each of the n-grams may be transformed into a corresponding vector. For example, unigram which describes interaction to be a "typed text" may be represented as "2" in the vector format. Similarly, unigram which describes interaction to be a “paste value” may be represented as “2” in the vector format as shown in the below table 2.

TABLE 2

| index | “Typed text” | “Close tab” | “Paste value” | “Save” |
|---|---|---|---|---|
| 4358 | 2 | −1 | 2 | 2 |
| 4370 | 2 | −1 | 2 | 2 |
| 4382 | 2 | 2 | 2 | 3 |
| 4394 | 2 | 2 | 2 | 3 |
| 4406 | 2 | 2 | 2 | 2 |

Further, performing click on the website such as Amazon™ and providing inputs by typing a text may be considered as the bigram. Such operations may be represented as shown in the table below.

TABLE 3

| Index | (“‘https://www.amazon.in Amazon.in : laptop hp ""span""Perform click’”, “‘https://www.amazon.inNew tab’”) | (“‘outlook""Untitled - Message (HTML) """"50019""NetUIRibbonTab""type text’”, “‘outlook""Attach File . . . """"50011""NetUIAnchor""type text’”) |
|---|---|---|
| 4358 | 1 | 1 |
| 4370 | 1 | 1 |
| 4382 | 2 | 1 |
| 4394 | 1 | 1 |

Upon transforming each of the identified plurality of potential data candidates into a corresponding potential data candidate vector, each of the interactions in potential data candidate vector is compared and a similarity score is obtained for the unigram vector. Similarly, the potential data candidate vectors of bigram and quad gram are also compared, and corresponding similarity scores may be obtained from the similarity determining module 221 as shown below.

TABLE 4

| | 0 | 1 | 2 | 3 | 4 |
|---|---|---|---|---|---|
| 0 | 0 | 81 | 83 | 87 | 85 |
| 1 | 0 | 0 | 88 | 79 | 85 |
| 2 | 0 | 0 | 0 | 84 | 83 |
| 3 | 0 | 0 | 0 | 0 | 87 |
| 4 | 0 | 0 | 0 | 0 | 0 |

When the similarity score is identified, the grouping module 223 groups potential data candidates as a group which may be indicating a particular task. The entire process may be repeated with the remaining set of potential data candidates until all possible groups are formed.

Figure 3A:
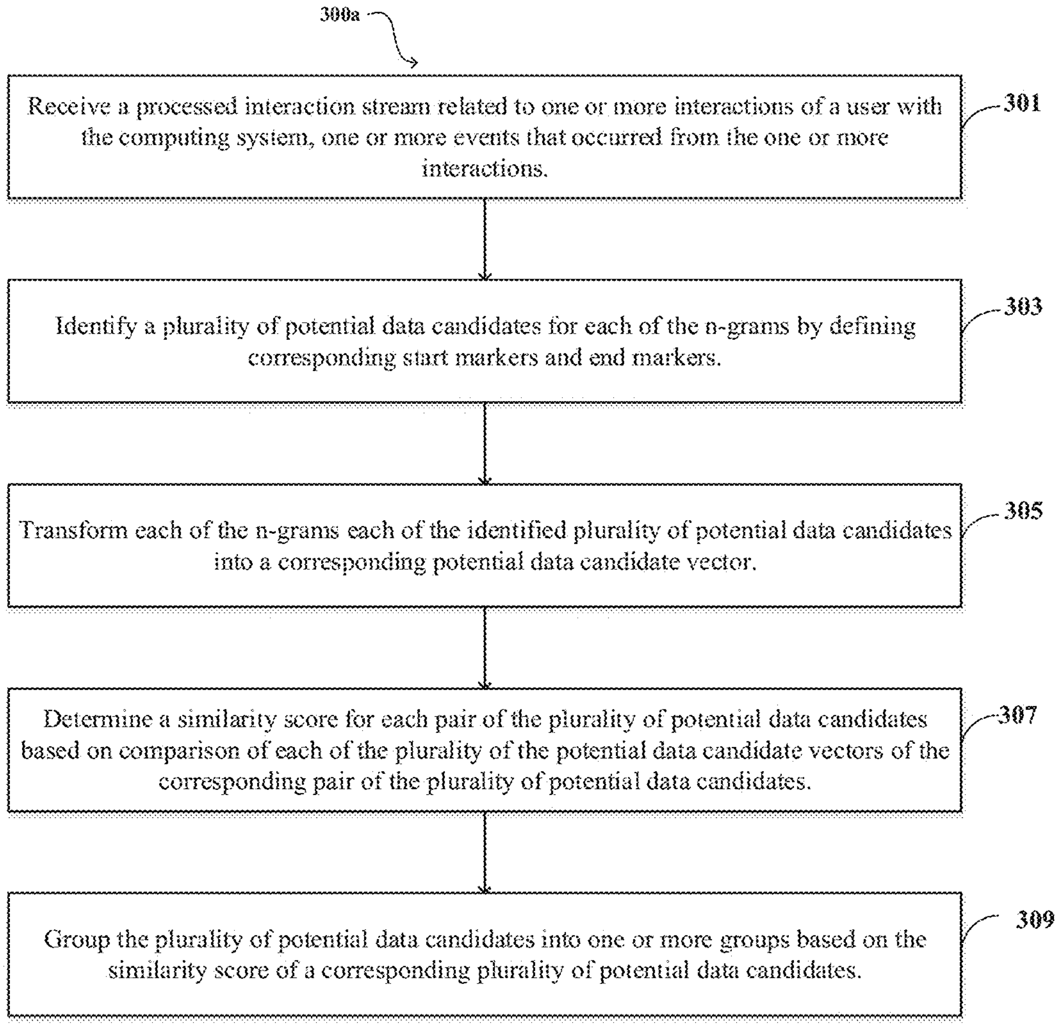
FIG. 3A shows a flowchart illustrating a method for identifying a task sequence from an interaction stream, in accordance with some embodiments of the present disclosure.

FIG. 3A illustrates a flowchart of a method for identifying a task sequence from an interaction stream, in accordance with some embodiments of the present disclosure.

As illustrated in FIG. 3, method 300*a* includes one or more blocks illustrating a method of identifying a task sequence from an interaction stream of a computing system 101. The method 300*a* may be described in the general context of computer executable instructions. Generally, computer executable instructions can include routines, programs, objects, components, data structures, procedures, modules, and functions, which perform functions or implement abstract data types.

The order in which the method 300*a* is described is not intended to be construed as a limitation, and any number of the described method blocks can be combined in any order to implement the method 300*a*. Additionally, individual blocks may be deleted from the methods without departing from the spirit and scope of the subject matter described herein. Furthermore, the method 300*a* can be implemented in any suitable hardware, software, firmware, or combination thereof.

At block 301, the method 300*a* may include receiving, by a processor 109 of a computing system 101, an interaction stream related to one or more interactions of a user 107 with the computing system 101, one or more events that occurred from the one or more interactions. The interaction stream may be a processed interaction stream. The processed interaction stream is transformed into n-grams.

At block 303, the method 300*a* may include identifying, by the processor 109, a plurality of potential data candidates for each of the n-grams by defining corresponding start markers and end markers.

At block 305, the method 300*a* may include transforming for each of the n-grams, by the processor 109, each of the identified plurality of potential data candidates into a corresponding potential data candidate vector. The potential data candidate vectors are numerical representation of the plurality of potential data candidates.

At block 307, the method 300*a* may include determining, by the processor 109, a similarity score for each pair of the plurality of potential data candidates based on comparison of each of the plurality of the potential data candidate vectors of the corresponding pair of the plurality of potential data candidates.

At block 309, the method 300*a* may include grouping, by the processor 109, the plurality of potential data candidates into one or more groups based on the similarity score of a corresponding plurality of potential data candidates, wherein each of the one or more groups indicates a unique task sequence of the processed interaction stream.

Figure 3B:
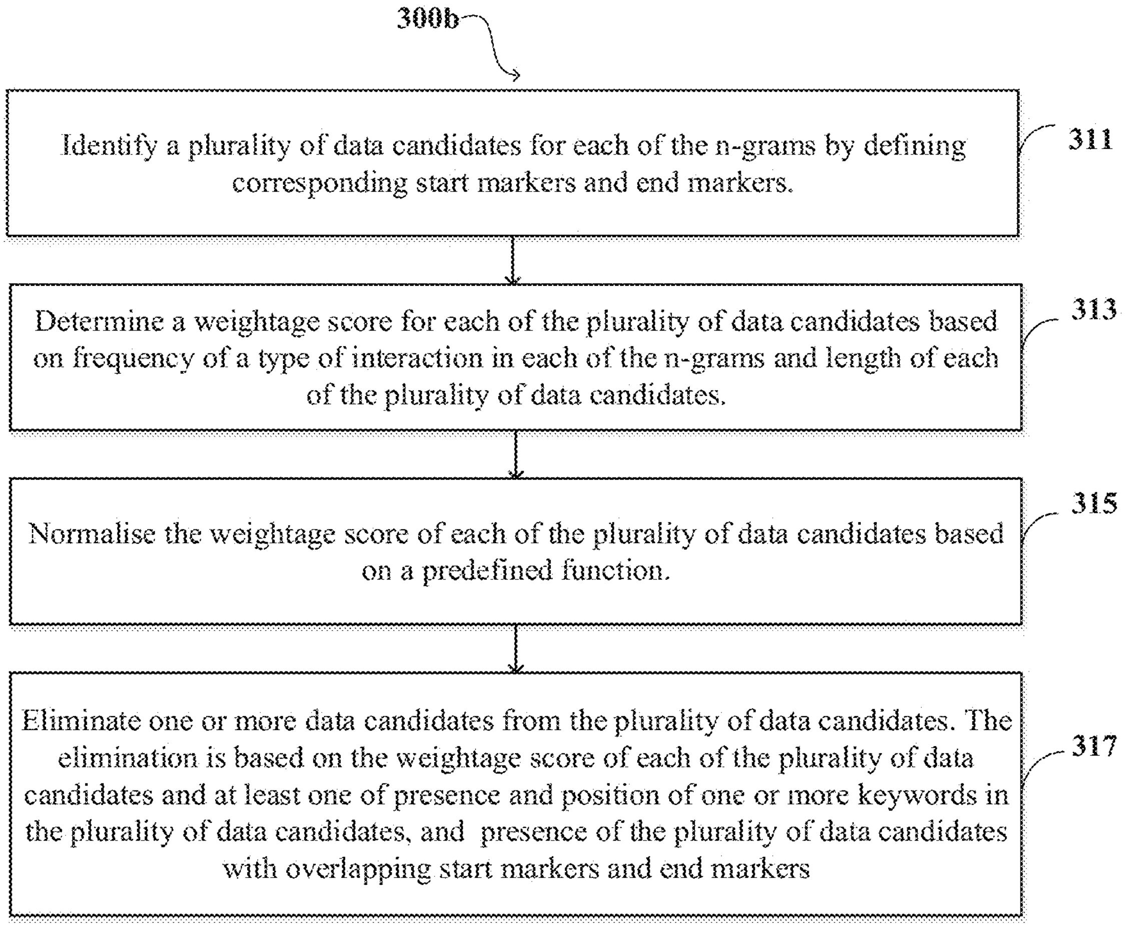
FIG. 3B illustrates a flowchart illustration of a method for identifying each of the plurality of potential data candidates, in accordance with some embodiments of the present disclosure.

FIG. 3B illustrates a flowchart illustration of a method for identifying each of the plurality of potential data candidates, in accordance with some embodiments of the present disclosure.

As illustrated in FIG. 3B, method 300*b* includes one or more blocks illustrating a method of identifying each of the plurality of potential data candidates. The method 300*b* may be described in the general context of computer executable instructions. Generally, computer executable instructions can include routines, programs, objects, components, data structures, procedures, modules, and functions, which perform functions or implement abstract data types.

The order in which the method 300*b* is described is not intended to be construed as a limitation, and any number of the described method blocks can be combined in any order to implement the method 300*b*. Additionally, individual blocks may be deleted from the methods without departing from the spirit and scope of the subject matter described herein. Furthermore, the method 300*b* can be implemented in any suitable hardware, software, firmware, or combination thereof.

At block 311, the method 300*b* may include identifying, by a processor 109, a plurality of data candidates for each of the n-grams by defining corresponding start markers and end markers for each of the n-grams.

At block 313, the method 300*b* may include determining, by the processor 109, a weighted score for each of the plurality of data candidates based on frequency of a type of interaction in each of the n-grams and length of each of the plurality of data candidates.

At block 315, the method 300*b* may include normalizing, by the processor 109, the weighted score of each of the plurality of data candidates based on a predefined function.

At block 315, the method 300*b* may include eliminating, by the processor 109, one or more data candidates from the plurality of data candidates, wherein the elimination is based on the weighted score of each of the plurality of data candidates, and at least one of presence and position of one or more keywords in the plurality of data candidates, and predefined acceptable range of length when the overlapping plurality of data candidates with same start markers and end markers are present. The plurality of data candidates remaining post elimination is identified as the plurality of potential data candidates.

Figure 4:
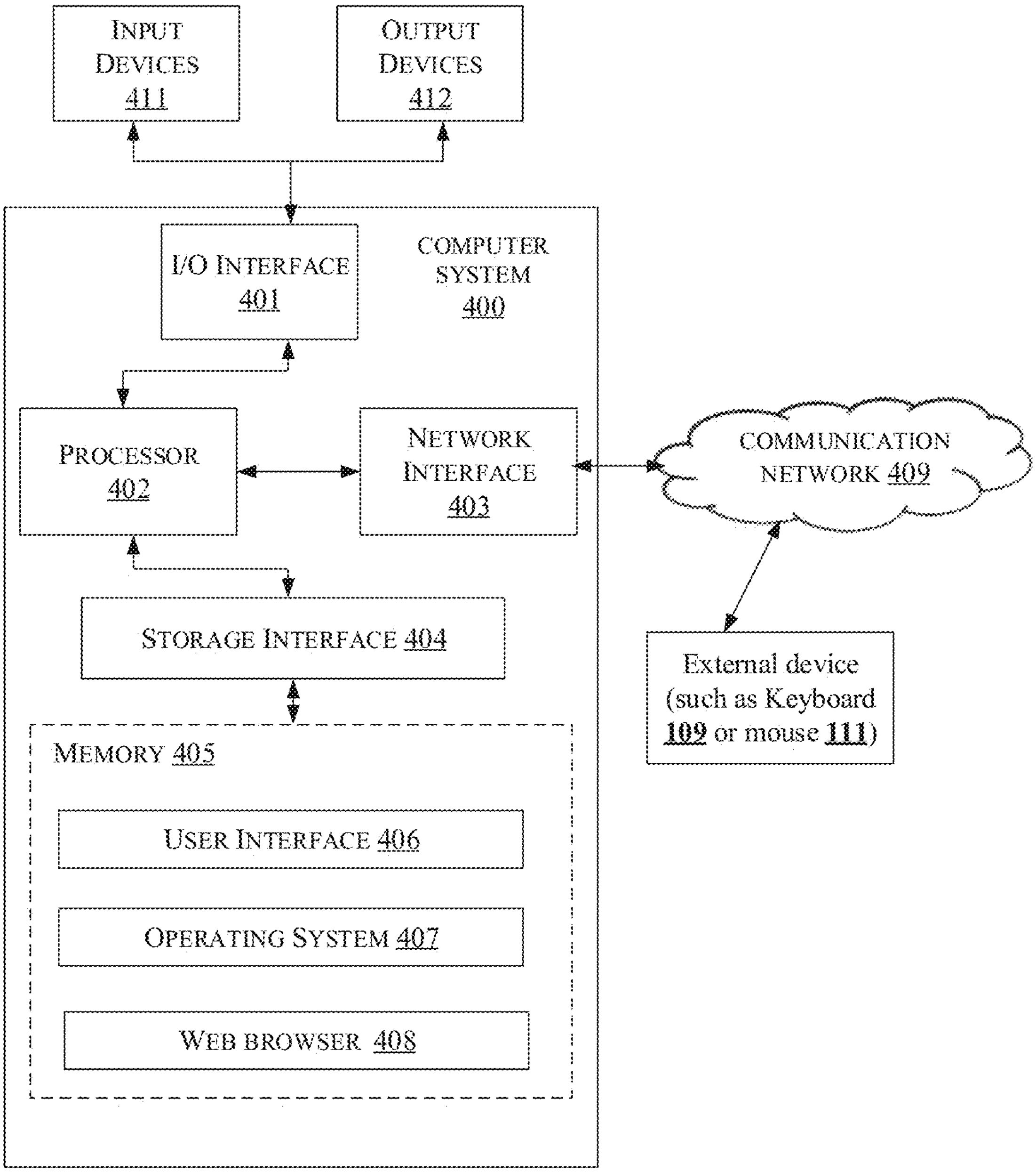
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 may be a computing system 101 that is used for identifying a task sequence from an interaction stream. The computer system 400 may include a central processing unit ("CPU" or "processor 402"). The processor 402 may include at least one data processor 402 for executing program components for executing user or system-generated business processes. A user 107 may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed of communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 401, computer system 400 may communicate with input devices 411 and output devices 412.

In some embodiments, the processor 402 may be disposed of in communication with a communication network 409 via a network interface 403. The network interface 403 may communicate with communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with external devices such as but not limited to keyboard 103 and mouse 105. The communication network 409 can be implemented as one of the different types of networks, such as intranet or Local Area Network (LAN), Closed Area Network (CAN). The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The user interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor 402 may be stored. Thus, a computer-readable storage medium may store instructions for execution by one or more processor 402, including instructions for causing the processor 402 to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Exemplary Advantages

The present disclosure relates to identifying a task sequence from an interaction stream. The present disclosure provides insights into the effort savings which helps to understand the optimal way of performing a particular task which also saves time as the manual effort is drastically reduced. The present disclosure enables monitoring the user activity and analyzing the time spent on various applications during working hours that may be enhancing productivity of an individual. Based on one or more groups of potential data candidates, the present disclosure provides insights into the value savings if a certain task is automated. The present disclosure helps to remove redundant tasks which in turn lead to time and cost saving. In the present disclosure basic or minimal knowledge of the process is sufficient to review the output. Further, the present disclosure is independent of historical data.

REFERRAL NUMERALS

| Reference Number | Description |
|---|---|
| 100 | Architecture |
| 101 | Computing system |
| 103 | Keyboard |
| 105 | Mouse |
| 107 | user |
| 109 | Processor |
| 111 | I/O interface |
| 113 | Memory |
| 203 | Data |
| 205 | Processed interaction stream data |
| 207 | Candidate data |
| 209 | Similarity score data |
| 211 | Other data |
| 213 | Modules |
| 215 | Receiving module |
| 217 | Candidate identifying module |
| 219 | Transforming module |
| 221 | Similarity score determining module |
| 223 | Grouping module |
| 225 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |

We claim:

1. A method of identifying a task sequence from an interaction stream, the method comprising:

receiving, by a computing system, an interaction stream related to one or more interactions of one or more users with the computing system, one or more events that occurred from the one or more interactions, wherein the processed interaction stream is transformed into n-grams;

identifying, by the computing system, a plurality of potential data candidates for each of the n-grams by interpreting corresponding start markers and end markers;

transforming for each of the n-grams, by the computing system, each of the identified plurality of potential data candidates into a corresponding potential data candidate vector, wherein the potential data candidate vectors are numerical representation of the plurality of potential data candidates;

determining, by the computing system, a similarity score for each pair of the plurality of potential data candidates based on comparison of each of the plurality of the potential data candidate vectors of the corresponding pair of the plurality of potential data candidates, wherein determining the similarity score comprises:

for each pair of the plurality of potential data candidates, comparing each interaction of each of the plurality of the potential data candidate vectors with each corresponding interaction of each of rest of the plurality of potential data candidate vectors;

assigning:

a predefined first score to each interaction of the plurality of potential data candidates, when a comparison results in an exact match of frequency of a type of interaction, a predefined second score to each interaction of the plurality of potential data candidates when the comparison results in mismatch of frequency of the type of interaction, a predefined third score to each interaction of the plurality of potential data candidates when the comparison results in absence of a common type of interaction;

determining a cumulative score based on the predefined first score, the predefined second score and the predefined third score assigned to each interaction of the corresponding plurality of potential data candidates; and determining the similarity score based on the corresponding cumulative score and a predefined weightage of each of the n-grams; and grouping, by the computing system, the plurality of potential data candidates into one or more groups based on the similarity score of a corresponding plurality of potential data candidates, wherein each of the one or more groups indicates a unique task sequence of the processed interaction stream.

2. The method of claim 1, wherein the identifying each of the plurality of potential data candidates comprises:

identifying a plurality of data candidates for each of the n-grams by defining corresponding start markers and end markers;

determining a weighted score for each of the plurality of data candidates based on frequency of a type of interaction in each of the n-grams and length of each of the plurality of data candidates;

normalizing the weighted score of each of the plurality of data candidates based on a predefined function to obtain a prioritization score, wherein each of the plurality of data candidates are prioritized based on the prioritization score;

eliminating one or more data candidates from the plurality of data candidates, wherein the elimination is based on the prioritization score of each of the plurality of data candidates and at least one of:

presence and position of one or more keywords in the plurality of data candidates, or predefined acceptable range of length when overlapping plurality of data candidates with same start markers and end markers are present, wherein the plurality of data candidates remaining post elimination are identified as the plurality of potential data candidates.

3. The method of claim 1, wherein each of the identified plurality of potential data candidates are transformed into the corresponding potential data candidate vector based on at least one of a frequency of a type of interaction and presence or absence of the interaction, by comparing each interaction of each of the plurality of the data candidate with each corresponding interaction of each of rest of the plurality of data candidates.

4. The method of claim 1, further comprises:

performing, by the computing system, an inter-group and intra-group comparison of each of the one or more groups to determine presence of at least one overlapping interaction in the plurality of potential data candidates;

eliminating, by the computing system, one or more of the plurality of potential data candidates from the one or more groups when the presence of at least one of the overlapping interactions is determined, wherein elimination is performed based on at least one of, length of the plurality of data candidates that are determined to have overlapping interactions and frequency of a type of interactions in the plurality of data candidates that are determined to have overlapping interactions.

5. The method of claim 1, wherein the n-grams are at least one of unigram, bigram, quad gram, pentagram, hexagram, and octagram.

6. A non-transitory computer readable medium including instructions stored thereon that when processed by at least one processor causes a computing system to perform operations comprising:

receiving an interaction stream related to one or more interactions of one or more users with the computing system, one or more events that occurred from the one or more interactions, wherein the processed interaction stream is transformed into n-grams;

identifying a plurality of potential data candidates for each of the n-grams by interpreting corresponding start markers and end markers;

transforming for each of the n-grams each of the identified plurality of potential data candidates into a corresponding potential data candidate vector, wherein the potential data candidate vectors are numerical representation of the plurality of potential data candidates;

determining a similarity score for each pair of the plurality of potential data candidates based on comparison of each of the plurality of the potential data candidate vectors of the corresponding pair of the plurality of potential data candidates, wherein determining the similarity score comprises:

for each pair of the plurality of potential data candidates, comparing each interaction of each of the plurality of the potential data candidate vectors with each corresponding interaction of each of rest of the plurality of potential data candidate vectors;

assigning:

a predefined first score to each interaction of the plurality of potential data candidates, when a comparison results in an exact match of frequency of a type of interaction, a predefined second score to each interaction of the plurality of potential data candidates when the comparison results in mismatch of frequency of the type of interaction, a predefined third score to each interaction of the plurality of potential data candidates when the comparison results in absence of a common type of interaction;

determining a cumulative score based on the predefined first score, the predefined second score and the predefined third score assigned to each interaction of the corresponding plurality of potential data candidates; and determining the similarity score based on the corresponding cumulative score and a predefined weightage of each of the n-grams; and grouping the plurality of potential data candidates into one or more groups based on the similarity score of a corresponding plurality of potential data candidates, wherein each of the one or more groups indicates a unique task sequence of the processed interaction stream.

7. A computing system of identifying a task sequence from an interaction stream, the computing system comprising:

a processor; and a memory communicatively coupled to the processor, wherein the memory stores the processor-executable instructions, which, on execution, causes the processor to:

receive an interaction stream related to one or more interactions of one or more users with the computing system, one or more events that occurred from the one or more interactions, wherein the processed interaction stream is transformed into n-grams;

identify a plurality of potential data candidates for each of the n-grams by defining corresponding start markers and end markers;

transform for each of the n-grams each of the identified plurality of potential data candidates into a corresponding potential data candidate vector, wherein the potential data candidate vectors are numerical representation of the plurality of potential data candidates;

determine a similarity score for each pair of the plurality of potential data candidates based on comparison of each of the plurality of the potential data candidate vectors of the corresponding pair of the plurality of potential data candidates, wherein to determine the similarity score, the processor is configured to:

for each pair of the plurality of potential data candidates, compare each interaction of each of the plurality of the potential data candidate vectors with each corresponding interaction of each of rest of the plurality of potential data candidate vectors;

assign:

a predefined first score to each interaction of the plurality of potential data candidates, when a comparison results in an exact match of frequency of a type of interaction, a predefined second score to each interaction of the plurality of potential data candidates when the comparison results in mismatch of frequency of the type of interaction, a predefined third score to each interaction of the plurality of potential data candidates when the comparison results in absence of a common type of interaction;

determine a cumulative score based on the predefined first score, the predefined second score and the predefined third score assigned to each interaction of the corresponding plurality of potential data candidates; and determine the similarity score based on the corresponding cumulative score and a predefined weightage of each of the n-grams; and group the plurality of potential data candidates into one or more groups based on the similarity score of a corresponding plurality of potential data candidates, wherein each of the one or more groups indicates a unique task sequence of the processed interaction stream.

8. The computing system of claim 7, wherein to identify each of the plurality of potential data candidates, the processor is configured to:

identify a plurality of data candidates for each of the n-grams by defining corresponding start markers and end markers;

determine a weighted score for each of the plurality of data candidates based on frequency of a type of interaction in each of the n-grams and length of each of the plurality of data candidates;

normalize the weighted score of each of the plurality of data candidates based on a predefined function to obtain a prioritization score, wherein each of the plurality of data candidates are prioritized based on the prioritization score;

eliminate one or more data candidates from the plurality of data candidates, wherein the elimination is based on the prioritization score of each of the plurality of data candidates and at least one of:

presence and position of one or more keywords in the plurality of data candidates, and predefined acceptable range of length when overlapping plurality of data candidates with same start markers and end markers are present, wherein the plurality of data candidates remaining post elimination is identified as the plurality of potential data candidates.

9. The computing system of claim 7, wherein each of the identified plurality of potential data candidates are transformed into the corresponding potential data candidate vector based on at least one of a frequency of a type of interaction and presence or absence of the interaction, by comparing each interaction of each of the plurality of the data candidate with each corresponding interaction of each of rest of the plurality of data candidates.

10. The computing system of claim 7, wherein the processor is further configured to:

perform an inter-group and intra-group comparison of each of the one or more groups to determine presence of at least one overlapping interaction in the plurality of potential data candidates;

eliminate one or more of the plurality of potential data candidates from the one or more groups when the presence of at least one of the overlapping interactions is determined, wherein elimination is performed based on at least one of, length of the plurality of data candidates that are determined to have overlapping interactions and frequency of a type of interactions in the plurality of data candidates that are determined to have overlapping interactions.

11. The computing system of claim 7, wherein the n-grams are at least one of unigram, bigram and quad gram, pentagram, hexagram, and octagram.

* * * * *